United States Patent
Kuroda et al.

(10) Patent No.: US 8,139,762 B2
(45) Date of Patent: Mar. 20, 2012

(54) ELECTRONIC DEVICE AND ACOUSTIC PLAYBACK METHOD

(75) Inventors: Jun Kuroda, Tokyo (JP); Yukio Murata, Tokyo (JP); Ukyou Mori, Tokyo (JP); Yasuhiro Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 906 days.

(21) Appl. No.: 12/161,996

(22) PCT Filed: Jan. 26, 2007

(86) PCT No.: PCT/JP2007/051306
§ 371 (c)(1),
(2), (4) Date: Jul. 24, 2008

(87) PCT Pub. No.: WO2007/086524
PCT Pub. Date: Aug. 2, 2007

(65) Prior Publication Data
US 2009/0003630 A1  Jan. 1, 2009

(30) Foreign Application Priority Data
Jan. 26, 2006 (JP) ................. 2006-017189

(51) Int. Cl.
*H04M 1/00* (2006.01)
*H04M 9/00* (2006.01)

(52) U.S. Cl. ................ 379/433.02; 379/433.11
(58) Field of Classification Search ............ 379/433.01, 379/433.02, 433.11, 433.13; 455/575.1, 455/575.3, 556.1
See application file for complete search history.

(56) References Cited

FOREIGN PATENT DOCUMENTS

| JP | 11-191795 | 7/1999 |
|---|---|---|
| JP | 2000-343035 | 12/2000 |
| JP | 2000-358097 | 12/2000 |
| JP | 2001-062396 | 3/2001 |
| JP | 2001-121079 | 5/2001 |
| JP | 2001-285412 | 10/2001 |
| JP | 2002-200460 | 7/2002 |
| JP | 2003-236467 | 8/2003 |
| JP | 2003-198680 | 11/2003 |
| JP | 2004-023431 | 1/2004 |
| JP | 2005-236574 | 9/2005 |

*Primary Examiner* — Tuan Nguyen
(74) *Attorney, Agent, or Firm* — Young & Thompson

(57) ABSTRACT

In a folding electronic device, a pair of micro-speakers is mounted in the upper housing, and a vibrating actuator is mounted in the lower housing. Both these micro-speakers and the vibrating actuator reproduce sound. The vibrating actuator causes the lower housing and external housing to vibrate, and in particular supplements the acoustic characteristics of the micro-speakers in the low-frequency region. Furthermore, in cases where sound is reproduced using the mobile terminal device constituting this electronic device, sound is reproduced by mounting the mobile terminal device in an external housing, charging device, or cradle.

9 Claims, 5 Drawing Sheets

ELECTRONIC DEVICE AND ACOUSTIC PLAYBACK METHOD

TECHNICAL FIELD

The present invention relates to an electronic device and an acoustic playback method, and more particularly relates to a small-sized electronic device on which is mounted a small-sized acoustic playback device which is superior in terms of frequency characteristics, and an acoustic playback method utilizing such a small-sized electronic device.

BACKGROUND ART

Generally, mobile terminal devices such as mobile telephones and the like have a small housing; accordingly, the playback of sounds such as voice, music, and the like is accomplished by mounting an electromagnetic microspeaker, piezoelectric speaker, or the like having a diameter of 2 cm or less. For example, speakers for mobile telephones and the like are described in Patent Document 1 and Patent Document 2. Furthermore, a speaker on which a vibrating actuator is mounted is disclosed in Patent Document 3, and vibrating actuators are disclosed in Patent Documents 4 and 5.

Patent Document 1: Japanese Patent Application Kokai Publication No. 2003-198680
Patent Document 2: Japanese Patent Application Kokai Publication No. 11-191795
Patent Document 3: Japanese Patent Application Kokai Publication No. 2004-23431
Patent Document 4: Japanese Patent Application Kokai Publication No. 2000-343035
Patent Document 5: Japanese Patent Application Kokai Publication No. 2001-62396

DISCLOSURE OF THE INVENTION

Problems the Invention is Intended to Solve

However, in the case of micro-speakers mounted in small-sized electronic devices such as mobile telephones or the like, the voice emission surface area is small, and accordingly, the amount of volume excluded by vibration is small, so that a problem arises in that the reproduction of sound at large volumes is difficult. Furthermore, in the micro-speakers, the drop in the acoustic emission impedance in the low-frequency region is conspicuous; consequently, in the range extending from the intermediate-frequency region to the low-frequency region, e.g., the range extending from several tens of hertz to 1 kHz, the problem of low acoustic reproduction performance is encountered. Accordingly, in such small-sized electronic devices, an improvement in the frequency characteristics of the micro-speakers is needed in order to perform sound reproduction with a feeling of volume.

It is an object of the present invention to provide an electronic device comprising an acoustic playback device which is capable of acoustic reproduction that covers a broader frequency band than conventional devices, and which has superior frequency characteristics, and an acoustic playback method for reproducing sound using such an electronic device.

Means for Solving the Problems

The electronic device of the present invention is characterized in having a first acoustic output unit composed of a speaker, and a second acoustic output unit composed of a vibrating actuator that converts an electric signal into a vibration, and a structural member that is driven by this vibrating actuator.

In the electronic device of the present invention, the type of speaker used may be any type of speaker; e.g., electromagnetic, piezoelectric, or electrostatic speakers may be used. Furthermore, in regard to the vibrating actuator as well, there are no particular restrictions on the type used; for example, electromagnetic, piezoelectric, or electrostatic actuators may be used. Examples of electronic device of the present invention include mobile telephone terminals, PDAs, and the like.

For example, it is preferable that the structural member be a plate member constituting a portion of the housing; furthermore, this may be a separate member as long as it is integrated with the housing.

Furthermore, for example, the first acoustic output unit has a high-pass filter connected to the signal input side, and the second acoustic output unit has a low-pass filter which is connected to the signal input side, the second acoustic output unit having a cut-off frequency comparable to the cut-off frequency of the high-pass filter. The first acoustic output unit composed of a speaker has good characteristics on the high-frequency side of the audible-frequency region (e.g., 1 kHz or greater), and the second acoustic output unit composed of a vibrating actuator has good characteristics on the low-frequency side of the audible-frequency region (e.g., 1 kHz or less); accordingly, good sound reproduction can be obtained in a broad frequency range by combining both of these acoustic outputs.

Moreover, in the electronic device of the present invention, it is preferable for example that the device have a driving unit for driving the second acoustic output unit, the device being linked to a key input, or to a telephone call-up signal, or the like. In this way, confirmation during key input and call-up is facilitated.

For example, such an electronic device is built into a mobile terminal device. Furthermore, it is preferable that this mobile terminal device have first and second housing parts connected to each other in a manner that allows relative pivoting, that the first acoustic output unit be disposed on the first housing part, and that the second acoustic output unit be disposed on the second housing part.

Furthermore, the acoustic playback method of the present invention is a method for reproducing sound using a mobile terminal device constituting the electronic device of the present invention, wherein sound is reproduced by mounting the mobile terminal device in an external housing, charging device, or cradle.

It is preferable that the electronic device of the present invention be applied to a small-sized mobile terminal device; in this case, furthermore, it is preferable that sound be reproduced with the electronic device mounted in an external housing, charging device, cradle, or the like that will readily vibrate.

Effects of the Invention

In the electronic device and acoustic playback method of the present invention, both the first and second acoustic output units have different frequency characteristics that complement each other; accordingly, in the reproduction of sound, good sound reproduction can be accomplished over a broad frequency range.

Figure 1:
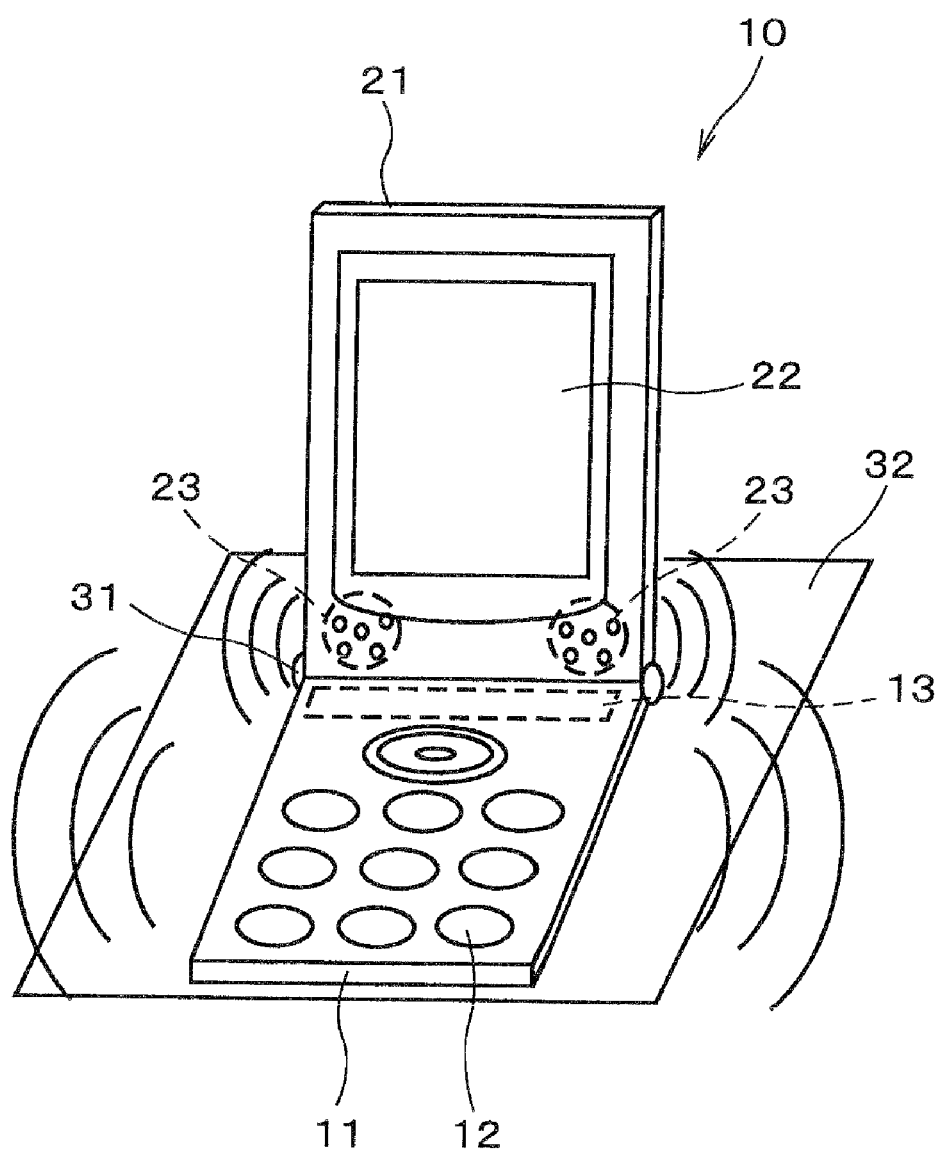
FIG. 1 is a perspective view of an electronic device having an acoustic playback device constituting a first embodiment of the present invention.

KEY 10, 10A through 10D: electronic device
11: lower housing
12: keyboard
13: vibrating actuator (piezoelectric element)
14: substrate
21: upper housing
22: display device
23: speaker
31: hinge
41: acoustic signal source
42: DSP
43: demodulating circuit
44: composite circuit
45: acoustic signal processing circuit
47, 52: D/A converter
48: high-pass filter
49, 54: driver amplifier
53, 50, 55: low-pass filter
51: first driving circuit
56: second driving circuit

BEST MODE FOR CARRYING OUT THE INVENTION

Preferred embodiments of the present invention will be concretely described below with reference to the attached figures. FIG. 1 shows a mobile telephone terminal 10, which is an electronic device provided with an acoustic playback device constituting a first embodiment of the present invention. The mobile telephone terminal 10 has a housing structure of a type that folds in two, and is composed of a lower housing 11 on which a keyboard 12 is mounted, and an upper housing 21 on which a display device 22 is mounted. Both housings 11 and 21 are connected by a hinge 31. A pair of micro-speakers 23 constituting a first acoustic (voice) output unit is mounted on the upper housing 21, and a vibrating actuator 13 constituting a second acoustic output unit is mounted on the lower housing unit 11.

The micro-speakers 23 are electromagnetic, piezoelectric, or electrostatic micro-speakers similar to conventional micro-speakers, and are disposed so that when both housings 11 and 21 are opened via the hinge 31, the front surfaces of the speakers are positioned at the front surface side of the upper housing 21. The vibrating actuator 13 may be an actuator having any desired vibrating mechanism; preferably, however, a piezoelectric element is selected. In cases where music or the like is played back using this mobile telephone terminal 10, it is preferable to dispose the lower housing 11 on top of a flat plate 32 such as a desk, box, or the like, and to increase the acoustic emission surface area for the sound from the vibrating actuator 13.

Figure 2:
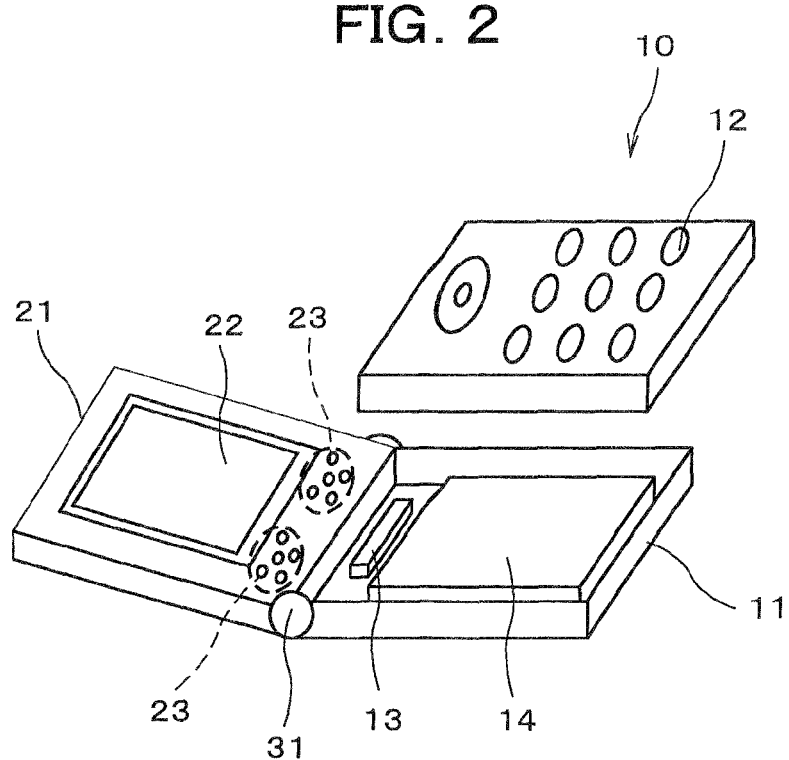
FIG. 2 is a perspective view showing the electronic device of FIG. 1 in an opened state except for the lower housing part.

FIG. 2 is an unfolded view showing the mobile telephone terminal 10 of FIG. 1 in a state in which the front surface side housing portion of the lower housing 11 has been removed. A substrate 14 on which various types of electronic parts, semiconductor devices, batteries, and the like are mounted, as well as a vibrating actuator 13, are fastened to a part on the back surface side of the lower housing 11 inside the lower housing 11. The vibrating actuator 13 extends along the side of the lower housing 11 adjacent to the hinge 31, and is pasted to a panel part constituting the back surface side of the lower housing 11. The micro-speakers 23 are disposed as a pair on both sides of the upper housing 21 near the hinge 31.

Figure 3:
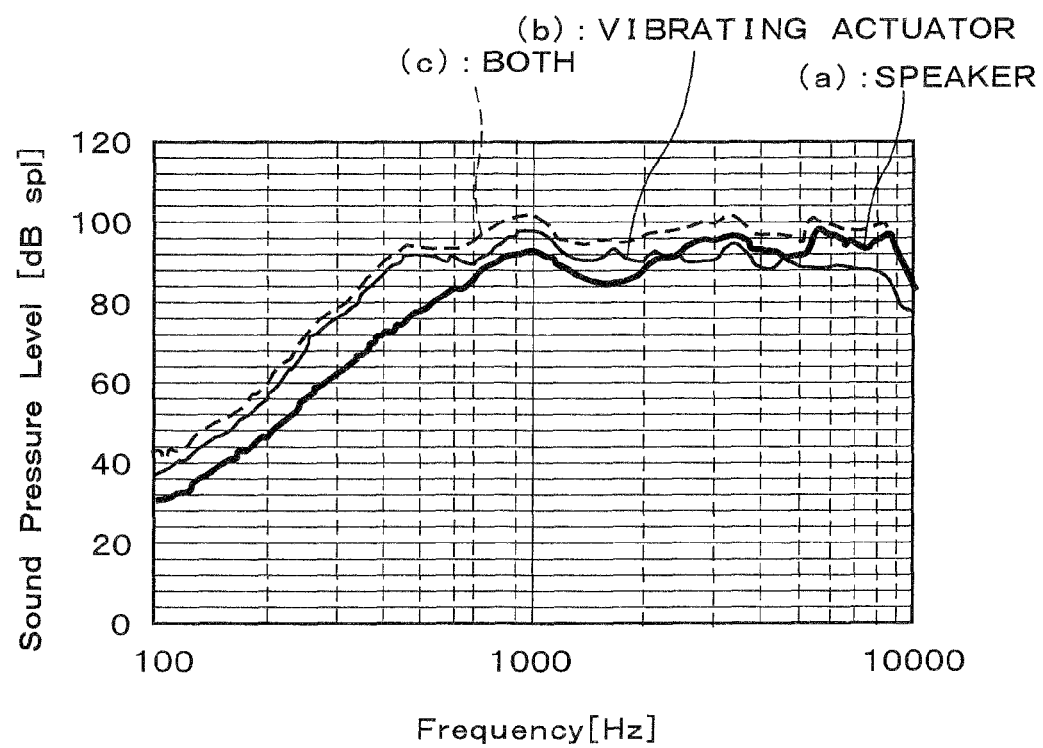
FIG. 3 is a graph showing sound pressure characteristics obtained when voice is reproduced using the electronic device of FIG. 1.

FIG. 3 is a graph showing the results obtained when the frequency characteristics of the sound in the mobile telephone terminal 10 were measured in the state shown in FIG. 1. The frequency (Hz) of the sound is plotted on the horizontal axis, and the sound pressure level (dB) is plotted on the vertical axis. Graph (a) shows the acoustic characteristics of the micro-speakers 23 alone, and graph (b) shows the simplex acoustic characteristics in a case where a piezoelectric element was used as the vibrating actuator 13. Furthermore, graph (c) shows the acoustic characteristics obtained when both devices were used in combination. Measurements were performed on the central axis of the screen of the display device 22 of the mobile telephone terminal 10 at a separation distance of 10 cm, and a condenser microphone for use in measurements was used. Moreover, the micro-speakers 23 to be assessed were electromagnetic speakers having a diameter of 16 mm. Furthermore, the vibrating actuator 13 that was used was a piezoelectric rectangular-solid actuator having a length of 25 mm, a width of 4 mm, and a thickness of 4 mm. A plate member made of a synthetic resin having a length of 15 cm, a width of 15 cm, and a thickness of 10 cm was used as the external housing 32 mounting the mobile telephone terminal 10.

During measurement, the system was adjusted so that the consumed power of the audio driving amplifier driving the acoustic output parts was approximately 0.5 W at 1 kHz. When the characteristics (a) of the micro-speakers 23 and the characteristics (b) of the vibrating actuator 13 are compared, it is seen that the characteristics (a) of the micro-speakers 23 surpass the characteristics (b) of the vibrating actuator 13 in the high region of 5 kHz or greater, but that the characteristics (b) of the vibrating actuator 13 surpass the characteristics (a) of the micro-speakers (23) in the intermediate and low regions that are lower than this. Especially in the frequency band that is equal to or lower than the primary resonance frequency of the vibrating actuator 13, the characteristics (b) of the vibrating actuator 13 surpass the characteristics (a) of the micro-speakers 23 by as much as approximately 20 dB or more. This is an effect that allows low-region playback which is difficult using the micro-speakers 23 to be accomplished by causing vibration of the external housing 32 which has a low vibrational resonance frequency via a piezoelectric actuator in which vibration can be obtained down to the low region of 100 Hz or less.

As is shown by the graph (c) in FIG. 3, when both acoustic output units 13 and 23 are simultaneously driven, audio playback which covers a broad frequency range extending from the high region to the low region becomes possible by adding both sound pressures together. Furthermore, in this mobile telephone terminal 10, the key clicking feeling, call-up feeling, and the like can be enhanced if the fine vibration of the terminal as a whole is utilized by inputting a low-region signal into the vibrating actuator 13 in combination with the pressing of a key or telephone call-up performed by the user.

In the electronic device of the present invention, as was described above, playback performance in the intermediate and low regions, where playback has conventionally been difficult, is conspicuously improved by mounting a vibrating actuator and driving the housing and the like of the electronic device, and by using an external housing for mounting the electronic device, in addition to the conventionally amounted micro-speaker. Accordingly, the sound pressure of the overall frequency band is improved, and good acoustic playback becomes possible. Furthermore, it was confirmed that even in cases where an external housing is not used, a great improvement in the acoustic characteristics in the intermediate and low regions is obtained by the vibration of the housing itself of the electronic device.

Figure 4:
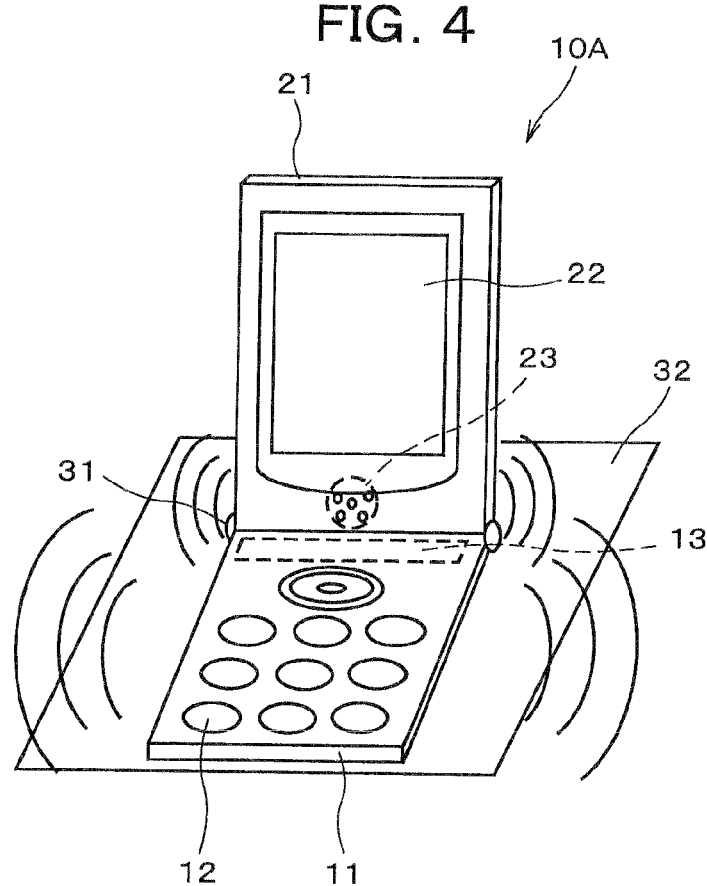
FIG. 4 is a perspective view of an electronic device having an acoustic playback device constituting a second embodiment of the present invention.

FIG. 4 shows a mobile telephone terminal 10A having an acoustic playback device constituting a second embodiment of the present invention. In this embodiment, the micro-speaker 23 disposed in the upper housing 21 is a monaural speaker; the remaining construction is the same as in the first embodiment. The same effects as in the first embodiment are also obtained in the present embodiment.

Figure 5:
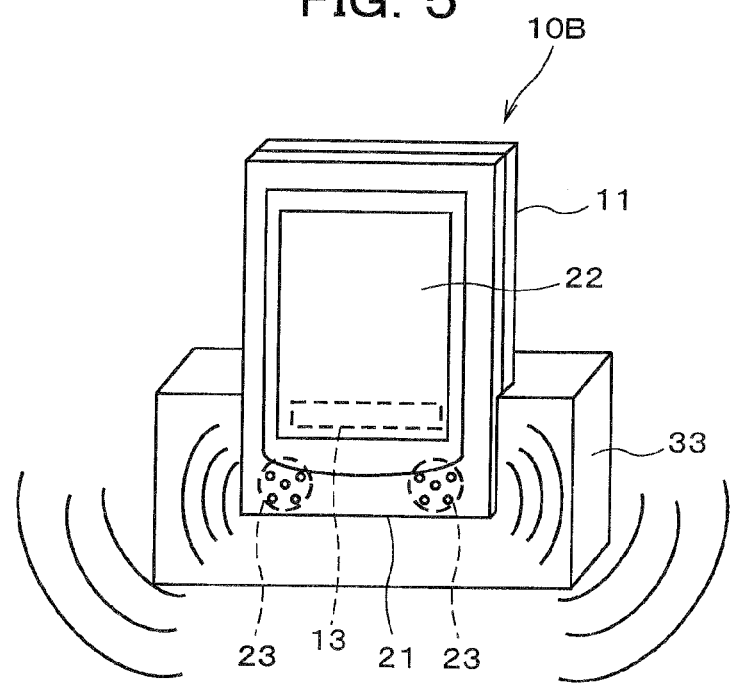
FIG. 5 is a perspective view showing a state in which an electronic device having an acoustic playback device constituting a third embodiment of the present invention is installed on a cradle.

In the acoustic playback device of the present invention, accessory parts of small-sized electronic devices, and charging adapters, cradles or the like obtained as separately purchased parts can be used as external housings (objects that can resonate with vibrated sound). In this case, for example, as is shown in FIG. 5 (third embodiment), it is preferable that the hinge of a structure that folds the lower housing 11 of the small-sized electronic device 10B onto the back surface side of the upper housing 21 be used. In the example shown in FIG. 5, as in the previous embodiment, the micro-speaker 23 is disposed on the upper housing 21, and the vibrating actuator 13 is mounted on the lower housing 11. If such a hinge structure is used, the small-sized electronic device 10B can be disposed in the charging adapter or cradle 33, and moving images displayed on the screen of the display device 22, and voice (sound) played back on the speaker 23 and vibrating actuator 13 over a broad band, can be simultaneously enjoyed. Furthermore, in FIG. 5, constructions that are the same as in FIG. 1 are labeled with the same symbols, and a detailed description of these constructions is omitted.

Figure 6:
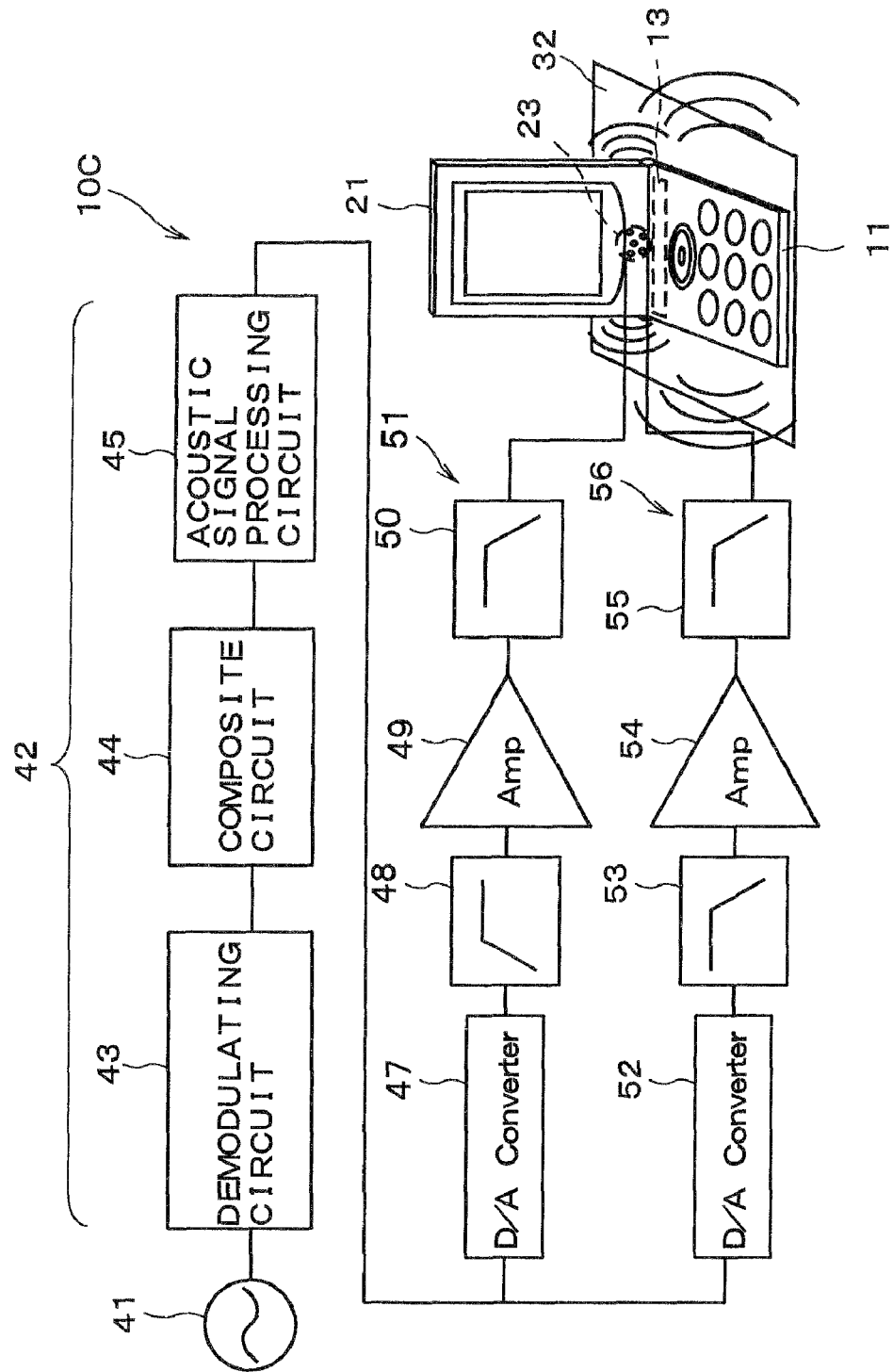
FIG. 6 is a block diagram of an electronic device having an acoustic playback device constituting a fourth embodiment of the present invention.

FIG. 6 is a block diagram showing an electronic device mounting an acoustic playback device constituting a fourth embodiment of the present invention. The mobile electronic device 10C comprises an acoustic signal source 41, a DSP 42 including a demodulating circuit 43, a composite circuit 44, and an acoustic signal processing circuit 45, a first acoustic output unit 23 comprising a micro-speaker, a second acoustic output unit 13 comprising a piezoelectric element, a first driving circuit 51 which drives the first acoustic output unit 23, a second driving circuit 56 which drives the second acoustic output unit 13, and housings 21 and 11 for mounting the first acoustic output unit 23 and second acoustic output unit 13 respectively.

The first driving circuit 51 has a D/A converter 47, a high-pass filter 48, a driver amplifier 49, and a low-pass filter 50. Furthermore, the second driving circuit 56 has a D/A converter 52, a low-pass filter 53, a driver amplifier 54, and a low-pass filter 55. Both D/A converters 47 and 52 convert the output of the DSP 42 into an analog signal. For example, the high-pass filter 48 of the first driving circuit 51 cuts off the frequency component of the low-frequency region by the cut-off frequency of 1 kHz and the cut-off characteristics of 3 dB/oct. Furthermore, for example, the low-pass filter of the second driving circuit 56 cuts off the frequency component of the high-frequency region by the cut-off frequency of 1 kHz and the cut-off characteristics of 3 dB/oct. In the outputs of both driver amplifiers 49, 54, the frequency components of audible frequencies or greater are excluded by the low-pass filters 50, 55, and are respectively output from the second and first acoustic output units 13, 23.

Figure 7:
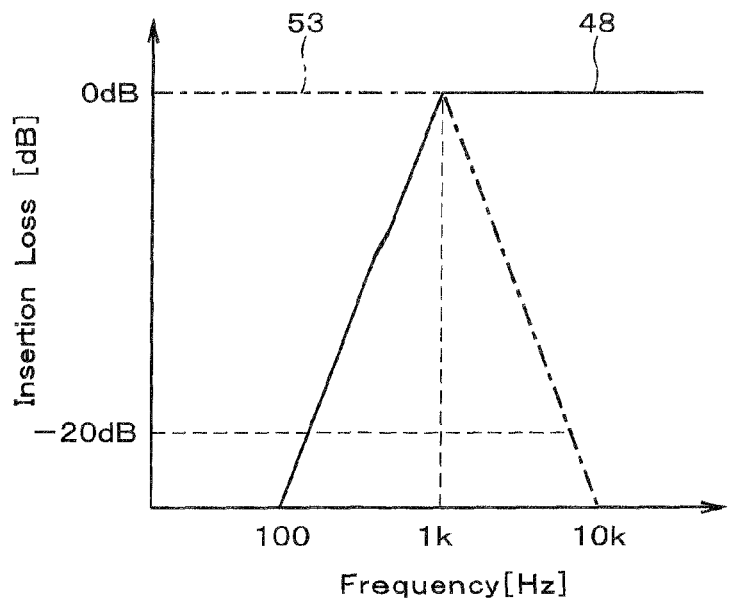
FIG. 7 is a graph showing the cut-off characteristics of the filter in the acoustic playback device of FIG. 6.

FIG. 7 shows the frequency characteristics of the high-pass filter 48 and low-pass filter 53. As a result of the cut-off frequency (1 kHz) and cut-off characteristics (3 dB/oct) of the high-pass filter 48 and low-pass filter 53 being provided as shown in the drawings, the overall acoustic output signals have substantially flat frequency characteristics.

In the present embodiment, the output of the acoustic signal source 41 is subjected to signal processing by the DSP 42, and is input into the first and second driving circuits 51 and 56. In the first driving circuit 51, the frequency component on the low-region side is excluded by the high-pass filter 48, the frequency component at audible frequencies or higher is excluded by the low-pass filter 50, and the remaining frequency component is output from the first acoustic output unit 23 comprising an electromagnetic micro-speaker. In the second driving circuit 56, the frequency component on the high-region side is excluded by the low-pass filter 53, the frequency component at audible frequencies or higher is excluded by the low-pass filter 55, and [the remaining frequency component] is output from the second acoustic output unit 13 comprising a piezoelectric actuator.

The piezoelectric actuator 13 has a substantially pure capacitive impedance in electrical terms; accordingly, low impedance is observed in the high-frequency region, and low-current driving is difficult to accomplish. In the present embodiment, therefore, a construction is used in which the high-frequency component is excluded prior to input into the piezoelectric actuator 13. Furthermore, the electromagnetic micro-speaker 23 has a low playback performance in the low-frequency region, and distortion tends to occur in signals in the low-frequency region with a large sound volume. Accordingly, the low-frequency component is excluded prior to input into the electromagnetic micro-speaker 23. In the present embodiment, as a result of such a construction, low-current driving and driving in which voice distortion in the low-frequency region is suppressed are possible.

In the present embodiment, furthermore, band-pass filters are inserted for the signals that are converted into analog signals by the D/A converters 47 and 52; however, it would also be possible to perform filter equalizer processing inside the signal processing unit or inside the D/A converters.

Figure 8:
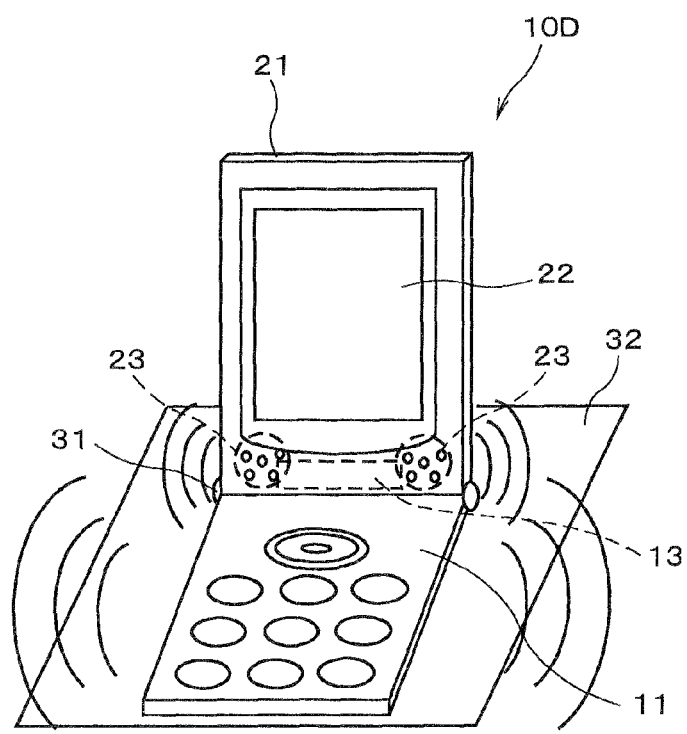
FIG. 8 is perspective view of an electronic device constituting a modification of the first embodiment.

FIG. 8 shows a modification of the first embodiment. In the electronic device 10D of this modification, the vibrating actuator 13 is disposed on the housing part on the back surface side of the upper housing 21. The other structures are the same as those shown in FIG. 1. In other words, in the electronic device having the acoustic playback device of the present invention, the vibrating actuator 13 need not necessarily be disposed on the housing part (lower housing 11) contacting the external housing 32; this actuator may also be disposed in the vicinity of the display device 22 as in the abovementioned modification. In this case, the acoustic characteristics are improved as a result of the vibrating actuator 13 causing the overall housing of the electronic device 10D to vibrate. Furthermore, the vibrating actuator in the present invention need not be directly mounted on the housing; this mounting may be on a substrate or the like on which electronic parts and the like are mounted, if the part is one that is mechanically connected to the housing, and has a structure that tends to transmit vibration.

Above, the present invention was described on the basis of preferred embodiments; however, the electronic device and acoustic playback method of the present invention are not limited to the constructions of the above-mentioned embodiments alone. Various modifications and alterations made from the constructions of the above-mentioned embodiments are also included in the scope of the present invention. Furthermore, in regard to the respective constructions described as preferred aspects of the present invention and the respective constructions described in the embodiments, it is preferable that these be used together with the essential constructions of the present invention; however, in regard to constructions which have beneficial effects even when used alone, it is not absolutely necessary that these be used with all of the constructions described as essential constructions of the present invention.

INDUSTRIAL APPLICABILITY

The present invention has a small housing size as in a mobile terminal device such as a mobile telephone or the like; accordingly, this is effective for high sound quality reproduction in electronic device with a low playback performance for sound such as voice, music, and the like.

The invention claimed is:

1. An electronic device comprising:
a first acoustic output unit composed of a speaker; and
a second acoustic output unit composed of a vibrating actuator that converts an electric signal into a vibration, and a structural member that is driven by the vibrating actuator,
wherein the first acoustic output unit is input with the electric signal in a higher frequency region than a predetermined frequency to generate a first measured value of sound pressure levels, the first measured value being greater than a second measured value of the sound pressure levels of the second acoustic output unit in the higher frequency region than the predetermined frequency, and
the second acoustic output unit is input with a signal in a lower frequency region than the predetermined frequency to generate a third measured value of the sound pressure levels, the third measured value being greater than a fourth measured value of sound pressure levels of the first acoustic output unit in the lower frequency region than the predetermined frequency.

2. The electronic device according to claim 1, wherein said speaker is an electromagnetic, piezoelectric, or electrostatic speaker.

3. The electronic device according to claim 1, wherein said vibrating actuator is an electromagnetic, piezoelectric, or electrostatic actuator.

4. The electronic device according to claim 1, wherein said structural member is a plate member that constitutes a portion of the housing.

5. The electronic device according to claim 1, wherein:
said first acoustic output unit has a high-pass filter which is connected to a signal input side; and
said second acoustic output unit has a low-pass filter which is connected to the signal input side, said second acoustic output unit having a cut-off frequency comparable to the cut-off frequency of said high-pass filter.

6. The electronic device according to claim 1, further comprising a driving unit for driving said second acoustic output unit, said driving unit being linked to a key input.

7. The electronic device according to claim 1, wherein the electronic device is incorporated into a mobile terminal device.

8. The electronic device according to claim 7, wherein:
said mobile terminal device has first and second housing parts which are connected to each other in a manner that allows relative rotation;
said first acoustic output unit is disposed on said first housing part; and
said second acoustic output unit is disposed on said second housing part.

9. An acoustic playback method for reproducing sound using a mobile terminal device comprising an electronic device comprised of a first acoustic output unit composed of a speaker and a second acoustic output unit composed of a vibrating actuator that converts an electric signal into a vibration, and a structural member that is driven by the vibrating actuator, the first acoustic output unit is input with the electric signal in a higher frequency region than a predetermined frequency to generate a first measured value of sound pressure levels, the first measured value being greater than a second measured value of the sound pressure levels of the second acoustic output unit in the higher frequency region than the predetermined frequency, and the second acoustic output unit is input with a signal in a lower frequency region than the predetermined frequency to generate a third measured value of the sound pressure levels, the third measured value being greater than a fourth measured value of sound pressure levels of the first acoustic output unit in the lower frequency region than the predetermined frequency, the acoustic playback method comprising:
mounting said mobile terminal device in an external housing, charging device, or cradle; and
reproducing sound.

* * * * *